United States Patent
Tanaka et al.

(10) Patent No.: US 6,988,489 B2
(45) Date of Patent: Jan. 24, 2006

(54) FUEL INJECTION VALVE PROTECTING APPARATUS AND FUEL PRESSURE INCREASE PREVENTING APPARATUS IN LPG INJECTION TYPE ENGINE

(75) Inventors: Shuji Tanaka, Tokyo (JP); Kazuo Nakatani, Tokyo (JP)

(73) Assignee: Nissan Kohki Co., Ltd., Samukawa (JP)

( * ) Notice: Subject to any disclaimer, the term of this patent is extended or adjusted under 35 U.S.C. 154(b) by 0 days.

(21) Appl. No.: 10/861,641

(22) Filed: Jun. 4, 2004

(65) Prior Publication Data

US 2004/0244778 A1    Dec. 9, 2004

(30) Foreign Application Priority Data

Jun. 6, 2003  (JP)  ............................. 2003-162131
Jun. 6, 2003  (JP)  ............................. 2003-162144

(51) Int. Cl.
*F02M 21/00*    (2006.01)
*F02D 41/22*    (2006.01)

(52) U.S. Cl. ...................................... 123/479; 123/529
(58) Field of Classification Search ................ 123/479, 123/490, 527, 529
See application file for complete search history.

(56) References Cited

U.S. PATENT DOCUMENTS 4,479,161 A * 10/1984 Henrich et al. ............. 123/490
5,690,078 A * 11/1997 Ofner ......................... 123/529

\* cited by examiner

*Primary Examiner*—Tony M. Argenbright

(57) ABSTRACT

A fuel injection valve protecting apparatus for an LPG injection type engine operates when an excessive current passes through the fuel injection valve, or when an abnormality of the fuel injection valve occurs. An electrical fuse is inserted in a driving current supply line of the fuel injection valve. An electronic control apparatus has an abnormality diagnostic unit to detect any abnormality of the fuel injection valve by monitoring a check signal sent back from a fuel injection valve driving circuit, to thereby close a fuel shutoff valve and shut off the liquefied petroleum gas. Relief valves are connected in parallel between a petroleum gas supply line and an intake manifold so as to directly discharge any petroleum gas in the petroleum gas supply line into the intake manifold when the pressure difference between the petroleum gas supply line and the intake manifold reaches a set differential pressure.

14 Claims, 3 Drawing Sheets

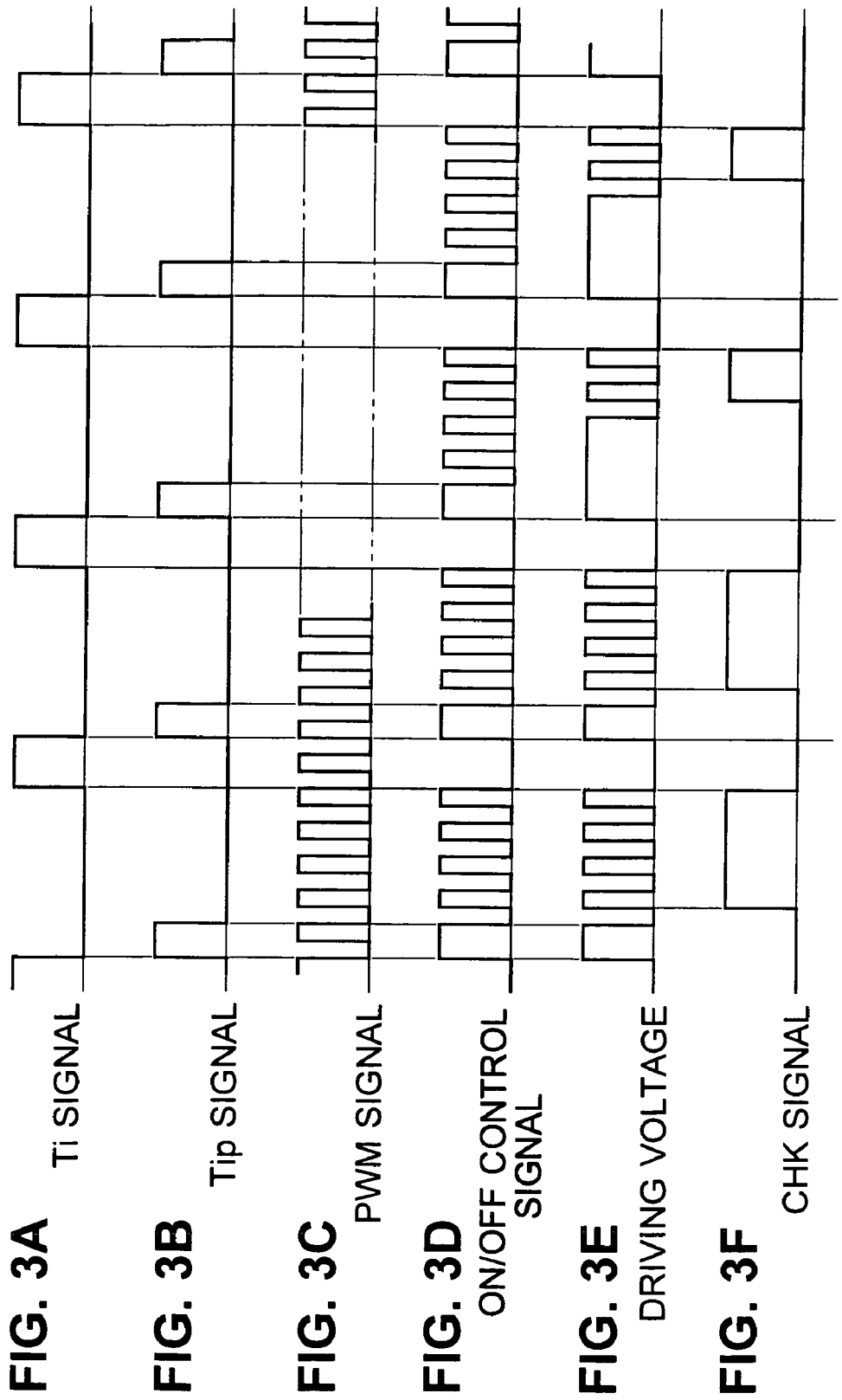

FUEL INJECTION VALVE PROTECTING APPARATUS AND FUEL PRESSURE INCREASE PREVENTING APPARATUS IN LPG INJECTION TYPE ENGINE

BACKGROUND OF THE INVENTION

1. Field of the Invention

The present invention relates to a protecting apparatus for an injection type engine employing a liquefied petroleum gas (LPG) as a fuel, and more particularly to a fuel injection valve protecting apparatus for protecting a fuel injection valve in the case where an excessive driving current flows through the fuel injection valve or some kind of abnormality or another occurs, and a fuel pressure increase preventing apparatus for protecting a petroleum gas fuel supplying system.

2. Description of the Related Art

In a conventional LPG injection type engine, a fuel injection valve is provided with no protecting means or protecting mechanism against an abnormal current. Accordingly, in the case where an abnormal current such as an excessive current flows through the fuel injection valve, or some kind or another abnormality occurs therein, it is impossible to protect the fuel injection valve. In general, the fuel injection valve of the LPG injection type engine injects a petroleum gas fuel into an intake manifold from a fuel injection port by attracting a needle valve with a magnetic force generated by a coil to open the fuel injection port thereof. However, in the case where an excessive current flows through the coil, there is a risk that the coil abnormally generates heat and a resin part of the fuel injection valve such as a bobbin around which the coil is wound is damaged.

Further, in the LPG injection type engine, in the case where a vaporizer for vaporizing a liquefied petroleum gas breaks down, there is a possibility that a pressure applied to the fuel injection valve becomes abnormally high. As the conventional LPG injection type engine is provided therein no mechanism or apparatus for inhibiting such a pressure increase, there is a risk that a part such as a pressure sensor or the like breaks down and an engine malfunction occurs due to the abnormal pressure increase.

Incidentally, Japanese Patent Laid-Open Publication No. 5-214937 discloses a technique that in order to prevent an after burn and a back fire caused by improperly supplying a gas fuel just before an engine stop during engine stalling or at a time of an engine start failure in a gas fuel engine using a hydrogen gas or the like, a fuel shutoff valve is provided on a downstream side of a flow regulating valve in a fuel passage, wherein an intake state is detected by a venturi of an intake manifold or the like, so that the fuel shutoff valve is closed before the engine stop. However, this technique is intended to prevent the after burn and the back fire at a time of the engine start failure and the engine stalling and is not relevant to the fuel gas pressure increase in the LPG injection type engine which is aimed at by the present invention, that is, this technique does not automatically inhibit the fuel gas pressure increase at the breakdown of the vaporizer or the like.

SUMMARY OF THE INVENTION

The present invention has been made in order to solve the problems mentioned above. Accordingly, it is an object of the present invention to provide a fuel injection valve protecting apparatus in an LPG injection type engine, which is capable of automatically shutting off a driving current applied to a fuel injection valve in the case where an abnormal current flows through the fuel injection valve, and which is capable of automatically shutting off a petroleum gas fuel supplied to the fuel injection valve so as to stop the engine and stop applying a control signal to the fuel injection valve from an electronic control apparatus in the case where some kind or another abnormality occurs in the fuel injection valve.

It is another object of the present invention to provide a fuel pressure increase preventing apparatus in an LPG injection type engine, which is capable of automatically releasing an excessive pressure of a petroleum gas so as to avoid a failure in parts such as a fuel pressure sensor and the like and an engine malfunction, even when a pressure of the petroleum gas applied to a fuel injection valve becomes abnormally high at the breakdown of a vaporizer for vaporizing a liquefied petroleum gas or the like.

In accordance with a first aspect of the present invention, there is provided a fuel injection valve protecting apparatus in an LPG injection type engine which includes an intake manifold, a fuel injection valve, a vaporizer for vaporizing a liquefied petroleum gas fed from a liquefied petroleum gas cylinder and converting it into a petroleum gas of a predetermined pressure so as to be supplied to the fuel injection valve, a fuel injection valve driving circuit for applying a driving current to the fuel injection valve, an electronic control apparatus for controlling the fuel injection valve driving circuit so as to open and close a fuel injection port of the fuel injection valve with the driving current from the fuel injection valve driving circuit, whereby the petroleum gas is injected into the intake manifold. The fuel injection valve protecting apparatus comprises: a fuel shutoff valve provided in a liquefied petroleum gas supply line connecting the liquefied petroleum gas cylinder to the vaporizer; and an electrical fuse inserted in a driving current supply line connected between the fuel injection valve driving circuit and the fuel injection valve; wherein the electronic control apparatus has an abnormality diagnostic means incorporated therein which detects an abnormality of the fuel injection valve by monitoring a check signal of the driving current sent back from the fuel injection valve driving circuit; and wherein when the driving current applied to the fuel injection valve exceeds a predetermined value, the electrical fuse melts to interrupt the driving current to the fuel injection valve, and when the abnormality diagnostic means of the electronic control apparatus detects the abnormality of the fuel injection valve, the engine is stopped by closing the fuel shutoff valve to shut off supplying of the liquefied petroleum gas and the operation of the fuel injection valve is halted by stopping applying a control signal to the fuel injection valve driving circuit from the electronic control apparatus.

According to the fuel injection valve protecting apparatus thus constructed, when an excessive current flows through the fuel injection valve, the electrical fuse melts to interrupt the driving current applied to the fuel injection valve. In addition, when some kind or another abnormality occurs in the fuel injection valve, the liquefied petroleum gas fuel can be shut off by the abnormality diagnostic program incorporated in the electronic control apparatus, and the driving current of the fuel injection valve can be stopped. Accordingly, the fuel injection valve can be doubly protected by the electrical fuse functioning as hardware and the abnormality diagnostic program functioning as software. Therefore, it is possible to securely prevent the internal parts of the fuel injection valve from being damaged due to an abnormal heating of the fuel injection valve or the like.

Further, in accordance with a second aspect of the present invention, there is provided a fuel pressure increase preventing apparatus in an LPG injection type engine which includes an intake manifold, a fuel injection valve and a vaporizer for vaporizing a liquefied petroleum gas fed from a liquefied petroleum gas cylinder and converting it into a petroleum gas of a predetermined pressure so as to be injected into the intake manifold from the fuel injection valve. The fuel pressure increase preventing apparatus comprises: a relief valve which opens a valve port thereof at a set differential pressure and which is connected between a petroleum gas supply line connecting the vaporizer to the fuel injection valve and the intake manifold; wherein when the pressure difference between the petroleum gas supply line and the intake manifold reaches the set differential pressure, the valve port of the relief valve is automatically opened so as to directly discharge the petroleum gas in the petroleum gas supply line into the intake manifold.

According to the fuel pressure increase preventing apparatus thus constructed, when an abnormal increase occurs in the gas pressure of the petroleum gas supply line connecting the vaporizer and the fuel injection valve, the petroleum gas can be directly discharged into the intake manifold by the relief valve, resulting in the gas pressure being inhibited from being abnormally increased.

In a preferred embodiment of the present invention, a plurality of the relief valves are provided in parallel between the petroleum gas supply line and the intake manifold and the plurality of the relief valves have respective set differential pressures which are different from each other, so that the plurality of relief valves sequentially operates based on the respective set differential pressures. Such construction can inhibit the gas pressure from being abnormally increased while the excessive gas pressure is released stepwise, to thereby achieve a more precise control.

Further, in a preferred embodiment of the present invention, the apparatus further comprises: a fuel shutoff valve provided in a liquefied petroleum gas supply line connecting the liquefied petroleum gas cylinder to the vaporizer; and a pressure sensor provided in the petroleum gas supply line connecting the vaporizer to the fuel injection valve; wherein when the pressure sensor detects the pressure of the petroleum gas supply line is equal to or more than a predetermined pressure, the fuel shutoff valve is operated so as to shut off the liquefied petroleum gas fed to the vaporizer from the liquefied petroleum gas cylinder. Such construction can automatically shut off the supply of the liquefied petroleum gas fuel, to thereby more securely inhibit the fuel pressure increase.

BRIEF DESCRIPTION OF THE DRAWINGS

FIGS. 3A to 3F are waveform views illustrating a diagnostic operation of an abnormality diagnostic program incorporated in an electronic control apparatus at the time of occurrence of the fuel injection valve abnormality.

DETAILED DESCRIPTION OF THE INVENTION

A description will be given below of an embodiment in accordance with the present invention with reference to the accompanying drawings.

Figure 1:
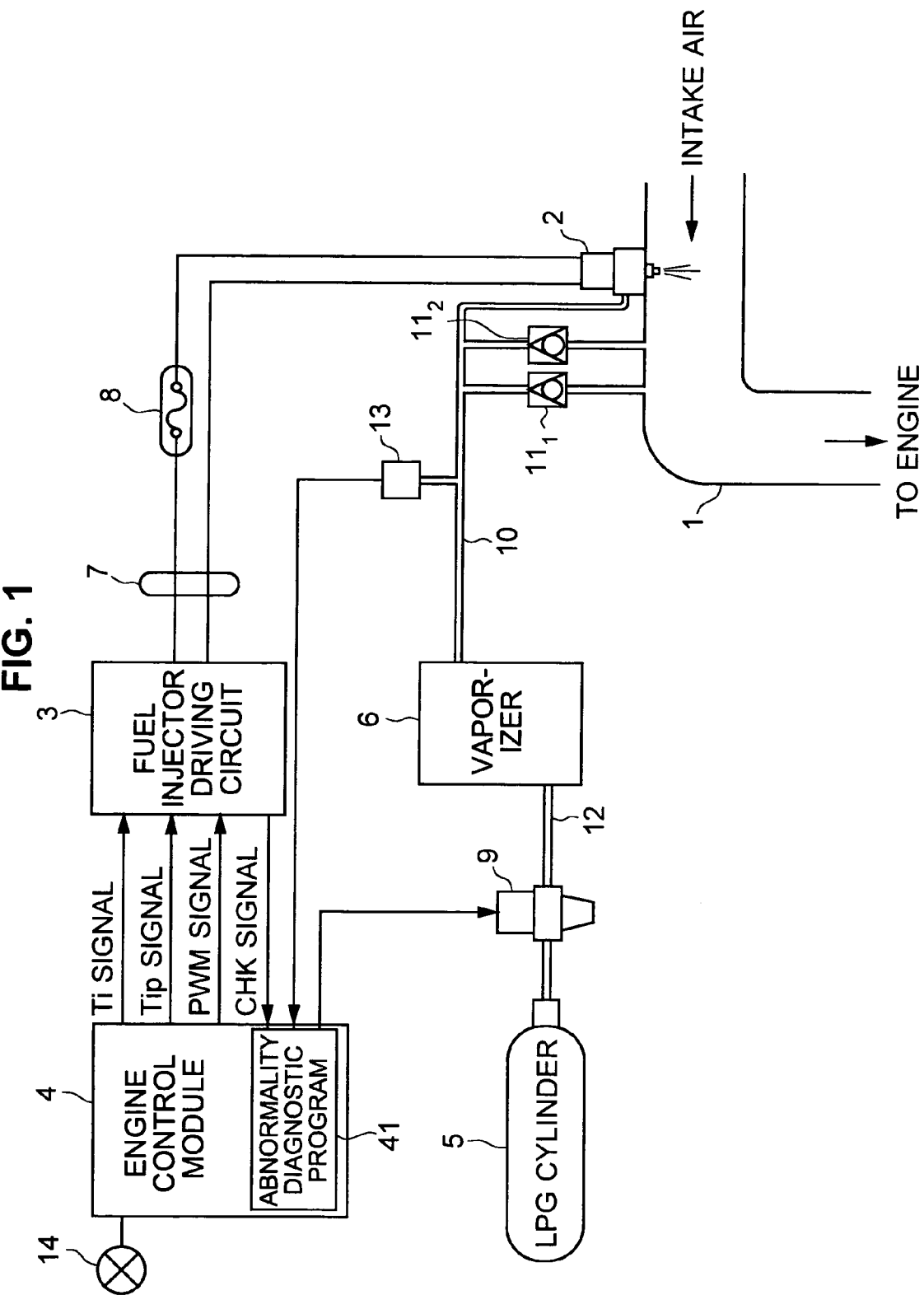
FIG. 1 is a block diagram showing the general constitution of a fuel injection valve protecting apparatus and a fuel pressure increase preventing apparatus in accordance with an embodiment of the present invention.

In FIG. 1, reference numeral 1 denotes an intake manifold of an LPG fuel type engine, reference numeral 2 denotes a fuel injector or fuel injection valve provided at an appropriate position of the intake manifold 1 for supplying a petroleum gas fuel, reference numeral 3 denotes a fuel injector driving circuit or fuel injection valve driving circuit for driving the fuel injection valve 2 to open and close, reference numeral 4 denotes an engine control module (ECM) or electronic control apparatus for executing a control of an entire engine, and reference numeral 5 denotes a liquefied petroleum gas cylinder storing a liquefied petroleum gas (LPG).

A vaporizer 6 is provided between the liquefied petroleum gas cylinder 5 and the fuel injection valve 2 and constructed to convert the liquefied petroleum gas of a high pressure, for example, about 18 kgf/cm$^2$, fed from the liquefied petroleum gas cylinder 5 into a petroleum gas of a predetermined pressure, for example, about 0.3 kgf/cm$^2$, so as to be injected into the intake manifold 1 from the fuel injection valve 2 at a predetermined timing under control of the electronic control apparatus 4.

The liquefied petroleum gas cylinder 5, the vaporizer 6, the fuel injection valve 2, the fuel injection valve driving circuit 3 and the electronic control apparatus 4 are similar to those which constitute a conventional fuel supply system in the LPG fuel type engine. However, in the present invention, the following construction is added to the conventional LPG fuel supply system so that the petroleum gas is directly discharged into the intake manifold 1 stepwise in correspondence to the pressure increase so as to relieve an abnormal gas pressure, when the pressure of the petroleum gas delivered from the vaporizer 6 is abnormally increased.

More specifically, in the present invention, two relief valves $11_1$ and $11_2$ are provided between a petroleum gas supply line 10 connecting the vaporizer 6 to the fuel injection valve 2 and the intake manifold 1 so as to be parallel to the fuel injection valve 2, and respective outlets thereof are directly faced the interior of the intake manifold 1. These two relief valves $11_1$ and $11_2$ are mechanical valves which are each operated on the basis of a differential pressure between a petroleum gas pressure within the petroleum gas supply line 10 and a pressure within the intake manifold 1. For example, a first one of the relief valves $11_1$ is set so as to operate at a differential pressure of 0.8 kgf/cm$^2$, and a second one of the relief valves $11_2$ is set so as to operate at a differential pressure of 1.2 kgf/cm$^2$. In the illustrated embodiment, the two relief valves $11_1$ and $11_2$ are provided independently, however, either or both of the relief valves may be integrally incorporated in the fuel injection valve 2.

Further, in the present invention, in order to stop the LPG fuel supply itself in the case where an abnormal pressure more than an allowable range is generated, a fuel shutoff valve 9 is provided in a liquefied petroleum gas supply line 12 connecting the liquefied petroleum gas cylinder 5 and the vaporizer 6, and the petroleum gas supply line 10 is provided with a petroleum gas fuel pressure sensor 13 for continuously monitoring or detecting a gas pressure within the petroleum gas supply line 10. Further, a warning light 14 is provided, so that when the abnormal pressure more than the allowable range is generated, the warning light 14 is turned on by the electronic control apparatus 4 to notify an abnormality. In this instance, the petroleum gas fuel pressure sensor 13 may be independently provided for exclusive use in the present invention, however, a gas pressure sensor which has been conventionally provided in the petroleum gas supply line 10 to control the engine may be commonly used as the petroleum gas fuel pressure sensor 13, whereby a detection signal thereof may be utilized for detecting the abnormality.

Figure 2:
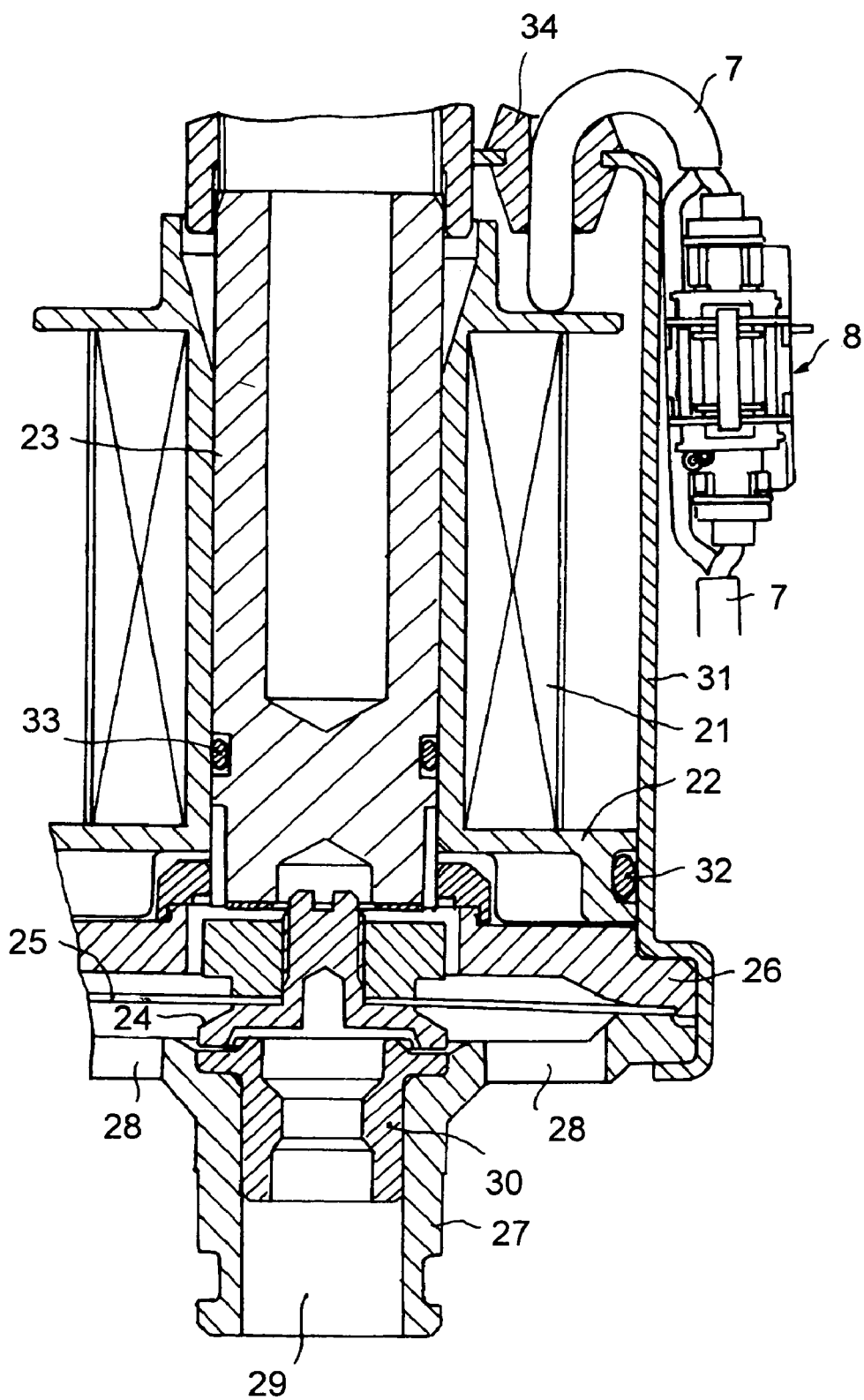
FIG. 2 is an enlarged partial cross sectional view showing a structure of a fuel injection valve.

The fuel injection valve 2 is constructed, as shown in detail in FIG. 2, in such a manner that an iron core or yoke 23 is fixedly arranged within a center bore of a flanged cylindrical bobbin 22 around which a coil 21 is wound, and a valve body 24 is arranged so as to oppose to a lower end surface (in the drawing) of the iron core 23 with a predetermined gap formed therebetween. The valve body 24 is mounted to a center of a disc-shaped leaf spring 25. The disc-shaped leaf spring 25 is fixed in a state where an outer peripheral edge portion thereof is held in an airtight manner between a fixed member 26 located on the upper side thereof and a injection nozzle member 27 located on the lower side thereof so that the valve body 24 can be vertically moved due to an elasticity of the leaf spring 25.

A fuel supply port 28 for supplying the petroleum gas fuel delivered from the vaporizer 6 is formed in a peripheral flange portion of the injection nozzle member 27, and a fuel injection port 29 for injecting the petroleum gas fuel supplied from the fuel supply port 28 into the intake manifold 1 is formed at the center of the injection nozzle member 27. Further, a valve seat 30 is fixedly arranged in an upper portion of the fuel injection port 29 so as to oppose to the valve body 24. The valve body 24 is kept in contact with the valve seat 30 in an airtight manner in a state where the fuel injection valve 2 is not operated, whereby the petroleum gas fuel supplied from the fuel supply port 28 is prevented from being delivered to the fuel injection port 29. In FIG. 2, reference numeral 31 denotes a casing or an outer sleeve, reference numerals 32 and 33 denote an O-ring for keeping an airtightness, and reference numeral 34 denotes a rubber bush closing an intake opening for a driving current supply line 7.

In the present invention, an electrical fuse 8 is inserted in the driving current supply line 7 supplying a driving current to the fuel injection valve 2, and the electronic control apparatus 4 has an abnormality diagnostic means or abnormality diagnostic program 41 incorporated therein. When the driving current applied to the fuel injection valve 2 exceeds a predetermined value, the electrical fuse 8 melts to interrupt the driving current to the fuel injection valve 2. When the abnormality diagnostic program 41 detects some kind or another abnormality of the fuel injection valve 2, the fuel shutoff valve 9 is closed so as to stop the supply of the petroleum gas fuel to the fuel injection valve 2.

Next, a description will be given of operations of the fuel injection valve protecting apparatus and the fuel pressure increase preventing apparatus constructed as described above.

First, a description will be given of a driving current shutoff operation executed by the electrical fuse 8 in the fuel injection valve protecting apparatus.

In the case where the driving current passing through the driving current supply line 7 is increased so as to become an excessive current greater than the predetermined value or rated value of the electrical fuse 8 for some kind or another reason, the electrical fuse melts so as to break the driving current supply line 7, to thereby automatically interrupt the driving current to the fuel injection valve 2.

When the driving current of the fuel injection valve 2 is shut off, the heat generation of the coil 21 due to the excessive current can be avoided. Accordingly, it is possible to inhibit the temperature inside the fuel injection valve 2 from being increased, resulting in the internal parts of the fuel injection valve 2, for example, the bobbin 22 made of resin, being prevented from melting. Further, when the driving current supply line 7 is broken, a magnetic force generated by the coil 21 is lost. Accordingly, the valve body 24 is moved downward by a returning force of the leaf spring 25 so as to come into close contact with the valve seat 30, to thereby close the fuel injection port 29. As a result, the injection of the petroleum gas fuel is stopped.

Next, a description will be given of the diagnostic operation with respect to the abnormality occurrence of the fuel injection valve 2, which is executed by the abnormality diagnostic program 41 incorporated in the electronic control apparatus 4, with reference to waveform views shown in FIGS. 3A to 3F.

In general, three kinds of control signals, i.e., Ti signal, Tip signal and PWM signal shown in FIGS. 3A, 3B and 3C are sent to the fuel injection valve driving circuit 3 from the electronic control apparatus 4 at respective predetermined timings. The fuel injection valve driving circuit 3 generates an ON/OFF control signal as shown in FIG. 3D by using the three kinds of control signals. Further, the fuel injection valve driving circuit 3 exercises an ON/OFF control of a driving power source connected to the driving current supply line 7 by using the generated ON/OFF control signal, and applies a driving voltage having a waveform shown in FIG. 3E to the coil 21 of the fuel injection valve 2.

When the driving voltage having the waveform shown in FIG. 3E is applied to the coil 21, the iron core 23 is magnetized by a magnetic field generated by the coil 21 to attract the valve body 24 so as to move it apart from the valve seat 30. When the valve body 24 is moved apart from the valve seat 30, the petroleum gas fuel delivered from the vaporizer 6 is fed to the fuel injection port 29 through the gap formed between the valve body 24 and the valve seat 30, resulting in the petroleum gas fuel being injected into the intake manifold 1.

In this case, the driving voltage having the waveform shown in FIG. 3E is applied to the fuel injection valve 2 because of the following reason. In order to attract and move the valve body 24 which is kept in close contact with the valve seat 30 toward the lower end surface of the iron core 23 with the magnetic force generated by the coil 21, an extremely large magnetic force is required, that is, an extremely large driving current is required. In contrast to this, once the valve body 24 is caused to be attached to the iron core 23, it is sufficient to flow such a small driving current as to keep the valve body 24 in an attached state. Accordingly, in order to move the valve body 24 by continuously applying the driving voltage for a certain period of time at the beginning of driving and then keep the valve body 24 in the attached state by applying the small driving current, the driving voltage is set to have a PWM signal form which is turned on and off at a predetermined duty ratio as shown in FIG. 3E. The driving voltage having such a PWM signal form permits an average value of the driving current to be changed in accordance with a rate of the ON/OFF time.

The fuel injection valve driving circuit 3 drives the fuel injection valve 2 with the driving voltage as mentioned above and generates a check signal CHK shown in FIG. 3F in correspondence to the voltage applied to the coil 21 so as to send it back to the electronic control apparatus 4. The check signal CHK is a signal corresponding to a width of the PWM signal waveform of the driving voltage shown in FIG. 3E.

On receipt of the check signal CHK, the electronic control apparatus 4 compares and collates a length and a timing position of the check signal CHK with the Ti signal and the Tip signal on the basis of the abnormality diagnostic program 41 incorporated therein, so that the electronic control apparatus 4 diagnoses whether or not the driving voltage having the predetermined waveform is applied as instructed. In the case where it is judged that the driving voltage having the predetermined waveform is applied as instructed, the injection control of the petroleum gas fuel is carried on. On the other hand, in the case where the waveform of the driving voltage is not the predetermined one, it is judged that some kind or another trouble occurs in the fuel injection valve 2.

For example, in the case where a PWM signal type ON/OFF portion slightly exists in the driving voltage, as seen in the last half portion of the waveform of the driving voltage in FIG. 3E, the driving current which is considerably larger than the holding current continuously flows through the coil 21 for a substantial period of time after the valve body 24 has been attached to the iron core 23. Accordingly, if the fuel injection is further kept on, the inner portion of the fuel injection valve 2 reaches an abnormally high temperature due to the heat generation of the coil 21, with the result that there is a risk that, for example, the bobbin 22 made of resin around which the coil 21 is wound melts. In the case where the driving voltage is applied as described above, since the PWM signal type portion slightly exists in the driving voltage as shown in FIG. 3E, the check signal CHK is slightly generated in the last half portion of the waveform thereof as shown in FIG. 3F. Therefore, it is possible to detect that the abnormality occurs in the fuel injection valve 2, by comparing and collating the check signal CHK with the Ti signal and the Tip signal in the electronic control apparatus 4.

Further, for example, in the case where the driving voltage applied to the fuel injection valve 2 has only the PWM signal type waveform, an illustration of which is omitted, there is a risk that only the small current required for keeping the attaching of the valve body 24 flows all the period of time, and the current is insufficient for causing the valve body 24 to be moved by the attractive force, whereby the valve body 24 is not attached to the iron core 23. In the case where the driving voltage of such a waveform is applied, the check signal CHK is continuously generated all the period of the fuel injection time. Accordingly, it is possible to detect that the abnormality occurs in the fuel injection valve 2, by comparing and collating the check signal CHK with the Ti signal and the Tip signal. As described above, it is possible to detect in a software-controlled manner various abnormalities occurring in the fuel injection valve 2, by comparing and collating the check signal CHK with the Ti signal and the Tip signal.

When it is judged, on the basis of the abnormality diagnostic program 41 incorporated in the electronic control apparatus 4 in the manner mentioned above, that some kind or another abnormality occurs in the fuel injection valve 2, the electronic control apparatus 4 sends the control signal to the fuel shutoff valve 9 connected to the liquefied petroleum gas supply line 12 connecting the liquefied petroleum gas cylinder 5 and the vaporizer 6 to close the fuel shutoff valve 9 and stop the supply of the petroleum gas fuel, to thereby stop the engine; and the electronic control apparatus 4 stops feeding of the control signal to the driving circuit 3 therefrom so as to halt the operation of the fuel injection valve 2. As a result, the fuel injection valve 2 can be protected from the occurrence of the abnormality.

Now, a description will be given of an operation of the fuel pressure increase preventing apparatus.

In the case where the pressure of the petroleum gas supplied to the fuel injection valve 2 from the vaporizer 6 is in a normal range, the two relief valves 11₁ and 11₂ and the fuel shutoff valve 9 are not operated, and the petroleum gas supplied toward the fuel injection valve 2 from the vaporizer 6 through the petroleum gas supply line 10 is injected into the intake manifold 1 from the fuel injection valve 2 under control of the electronic control apparatus 4.

In this case, if some kind or another failure occurs in the vaporizer 6, and the gas pressure within the petroleum gas supply line 10 is increased and reaches the set pressure 0.8 kgf/cm² of the first relief valve 11₁, the first relief valve 11₁ operates to open the valve port thereof. When the valve port of the first relief valve 11₁ is opened, the petroleum gas within the petroleum gas supply line 10 under the abnormal pressure condition is directly discharged into the intake manifold 1 from the first relief valve 11₁ while bypassing the fuel injection valve 2. As a result, it is possible to inhibit the petroleum gas within the petroleum gas supply line 10 from being abnormally increased in pressure, resulting in the failure in the parts such as the fuel pressure sensor 13 and the like and the engine malfunction caused by the abnormal gas pressure being automatically avoided.

In the case where the gas pressure within the petroleum gas supply line 10 is further increased, and the pressure increase can not sufficiently restricted only by the first relief valve 11₁, the second relief valve 11₂ operates to open the valve port thereof at the time the pressure of the petroleum gas reaches the set pressure 1.2 kgf/cm² of the second relief valve 11₂. As a result, the petroleum gas is directly discharged into the intake manifold 1 by the two valves or first and second relief valves 11₁ and 11₂. Accordingly, it is possible to securely inhibit the pressure of the petroleum gas from being increased.

In addition, the gas pressure within the petroleum gas supply line 10 is detected by the petroleum gas fuel pressure sensor 13 and is continuously monitored by the electronic control apparatus 4. Accordingly, in the case where the pressure of the petroleum gas is further increased even though both the first relief valve 11₁ and the second relief valve 11₂ operates, the electronic control apparatus 4 diagnoses on the basis of the pressure change that the abnormality over the allowable range occurs and operates the fuel shutoff valve 9 provided in the liquefied petroleum gas supply line 12 connecting the liquefied petroleum gas cylinder 5 to the vaporizer 6, to thereby forcibly shuts off the liquefied petroleum gas supply line 12. Therefore, the supply of the liquefied petroleum gas fuel itself is forcibly stopped, so that it is possible to inhibit the pressure from being further increased. Further, at the same time, the electronic control apparatus 4 turns on the warning light 14 to notify of the occurrence of the pressure abnormality.

In the embodiment described above, the description is given of the example in which two relief valves are provided, however, the number of the relief valves is not limited to two, but three or more relief valves may be provided, and only one relief valve may be provided depending upon circumstances. In general, the more the number of the relief valve is, the more precisely the abnormal pressure can be controlled so as to be inhibited.

As described above, the fuel injection valve protecting apparatus of the present invention is constructed so that the fuel injection valve is doubly protected by a hardware safety means or electrical fuse and a software safety means or abnormality diagnostic program incorporated in the electronic control apparatus, resulting in the fuel injection valve being prevented from being damaged due to the abnormal heat generation or the like.

Further, the fuel pressure increase preventing apparatus of the present invention is constructed so as to automatically open the valve port of the relief valve and directly discharge the petroleum gas in the petroleum gas supply line into the intake manifold in the case where the pressure difference between the petroleum gas supply line and the intake manifold reaches the set pressure, to thereby automatically avoid the failure in the parts such as the fuel pressure sensor and the like and the engine malfunction caused by the abnormal pressure of the petroleum gas.

In one embodiment of the present invention, a plurality of relief valves are provided in parallel and the set differential pressures thereof are different from each other. Such construction permits the relief valves to open in a sequential order in accordance with the pressure increase, to thereby achieve a more precise control.

Further, in one embodiment of the present invention, the fuel shutoff valve is operated so as to forcibly shut off the liquefied petroleum gas fuel fed to the vaporizer from the liquefied petroleum gas cylinder in the case where the petroleum gas fuel pressure sensor detects the pressure of the LPG supply line is equal to or more than the set pressure, to thereby automatically shut off the supply of the liquefied petroleum gas fuel and more securely inhibit the fuel pressure increase.

While the illustrative and presently preferred embodiment of the present invention has been described in detail herein, it is to be understood that the inventive concepts may be otherwise variously embodied and employed and that the appended claims are intended to be construed to include such variations except insofar as limited by the prior art.

What is claimed is:

1. A fuel injection valve protecting apparatus in an LPG injection type engine which includes an intake manifold, a fuel injection valve, a vaporizer for vaporizing a liquefied petroleum gas fed from a liquefied petroleum gas cylinder and converting it into a petroleum gas of a predetermined pressure so as to be supplied to the fuel injection valve, a fuel injection valve driving circuit for applying a driving current to the fuel injection valve, an electronic control apparatus for controlling the fuel injection valve driving circuit so as to open and close a fuel injection port of the fuel injection valve with the driving current from the fuel injection valve driving circuit, whereby the petroleum gas is injected into the intake manifold, the fuel injection valve protecting apparatus comprising:
   a fuel shutoff valve provided in a liquefied petroleum gas supply line connecting the liquefied petroleum gas cylinder to the vaporizer; and
   an electrical fuse inserted in a driving current supply line connected between the fuel injection valve driving circuit and the fuel injection valve;
   wherein the electronic control apparatus has an abnormality diagnostic means incorporated therein which detects an abnormality of the fuel injection valve by monitoring a check signal of the driving current sent back from the fuel injection valve driving circuit; and
   wherein when the driving current applied to the fuel injection valve exceeds a predetermined value, the electrical fuse melts to interrupt the driving current to the fuel injection valve, and when the abnormality diagnostic means of the electronic control apparatus detects the abnormality of the fuel injection valve, the engine is stopped by closing the fuel shutoff valve to shut off supplying of the liquefied petroleum gas and the operation of the fuel injection valve is halted by stopping applying a control signal to the fuel injection valve driving circuit from the electronic control apparatus.

2. The fuel injection valve protecting apparatus as defined in claim 1, further comprising a relief valve which opens a valve port thereof at a set differential pressure and which is connected between a petroleum gas supply line connecting the vaporizer to the fuel injection valve and the intake manifold;
   wherein when the pressure difference between the petroleum gas supply line and the intake manifold reaches the set differential pressure, the valve port of the relief valve is automatically opened so as to directly discharge the petroleum gas in the petroleum gas supply line into the intake manifold.

3. The fuel injection valve protecting apparatus as defined in claim 2, wherein a plurality of the relief valves are provided in parallel between the petroleum gas supply line and the intake manifold and the plurality of relief valves have respective set differential pressures which are different from each other, so that the plurality of relief valves sequentially operates based on the respective set differential pressures.

4. The fuel injection valve protecting apparatus as defined in claim 2, further comprising a pressure sensor provided in the petroleum gas supply line connecting the vaporizer to the fuel injection valve;
   wherein when the pressure sensor detects the pressure of the petroleum gas supply line is equal to or more than a predetermined pressure, the fuel shutoff valve is operated so as to shut off the liquefied petroleum gas fed to the vaporizer from the liquefied petroleum gas cylinder.

5. The fuel injection valve protecting apparatus as defined in claim 3, further comprising a pressure sensor provided in the petroleum gas supply line connecting the vaporizer to the fuel injection valve;
   wherein when the pressure sensor detects the pressure of the petroleum gas supply line is equal to or more than a predetermined pressure, the fuel shutoff valve is operated so as to shut off the liquefied petroleum gas fed to the vaporizer from the liquefied petroleum gas cylinder.

6. A fuel pressure increase preventing apparatus in an LPG injection type engine which includes an intake manifold, a fuel injection valve and a vaporizer for vaporizing a liquefied petroleum gas fed from a liquefied petroleum gas cylinder and converting it into a petroleum gas of a predetermined pressure so as to be injected into the intake manifold from the fuel injection valve, the fuel pressure increase preventing apparatus comprising:
   a relief valve which opens a valve port thereof at a set differential pressure and which is connected between a petroleum gas supply line connecting the vaporizer to the fuel injection valve and the intake manifold;
   wherein when the pressure difference between the petroleum gas supply line and the intake manifold reaches the set differential pressure, the valve port of the relief valve is automatically opened so as to directly discharge the petroleum gas in the petroleum gas supply line into the intake manifold.

7. The fuel pressure increase preventing apparatus as defined in claim 6, wherein a plurality of the relief valves are provided in parallel between the petroleum gas supply line and the intake manifold and the plurality of the relief valves have respective set differential pressures which are different from each other, so that the plurality of relief valves sequentially operates based on the respective set differential pressures.

8. The fuel pressure increase preventing apparatus as defined in claim 6, further comprising:
a fuel shutoff valve provided in a liquefied petroleum gas supply line connecting the liquefied petroleum gas cylinder to the vaporizer; and
a pressure sensor provided in the petroleum gas supply line connecting the vaporizer to the fuel injection valve;
wherein when the pressure sensor detects the pressure of the petroleum gas supply line is equal to or more than a predetermined pressure, the fuel shutoff valve is operated so as to shut off the liquefied petroleum gas fed to the vaporizer from the liquefied petroleum gas cylinder.

9. The fuel pressure increase preventing apparatus as defined in claim 7, further comprising:
a fuel shutoff valve provided in a liquefied petroleum gas supply line connecting the liquefied petroleum gas cylinder to the vaporizer; and
a pressure sensor provided in the petroleum gas supply line connecting the vaporizer to the fuel injection valve;
wherein when the pressure sensor detects the pressure of the petroleum gas supply line is equal to or more than a predetermined pressure, the fuel shutoff valve is operated so as to shut off the liquefied petroleum gas fed to the vaporizer from the liquefied petroleum gas cylinder.

10. In an injection type engine which includes an intake manifold, a fuel injection valve, a vaporizer for vaporizing a liquefied petroleum gas fed from a liquefied petroleum gas source and converting it into a petroleum gas of a predetermined pressure so as to be supplied to the fuel injection valve, a fuel injection valve driving circuit for applying a driving current to the fuel injection valve, an electronic control apparatus for controlling the fuel injection valve driving circuit so as to open and close a fuel injection port of the fuel injection valve with the driving current from the fuel injection valve driving circuit, whereby the petroleum gas is injected into the intake manifold, the improvement comprising:
a fuel shutoff valve provided in a liquefied petroleum gas supply line connecting the liquefied petroleum gas source to the vaporizer; and
an electronic control apparatus for controlling the fuel injection valve driving circuit including an abnormality diagnostic unit which detects an abnormality of the fuel injection valve by monitoring a check signal of the driving current sent back from the fuel injection valve driving circuit,
wherein when the abnormality diagnostic unit detects the abnormality of the fuel injection valve, the engine is stopped by closing the fuel shutoff valve to shut off the supplying of the liquefied petroleum gas and the operation of the fuel injection valve is halted by applying a stop control signal to the fuel injection valve driving circuit from the electronic control apparatus.

11. The improvement of claim 10, further comprising a relief valve which opens a valve port thereof at a set differential pressure and which is connected between the liquid petroleum gas supply line connecting the vaporizer to the fuel injection valve and the intake manifold;
wherein when the pressure difference between the liquid petroleum gas supply line and the intake manifold reaches the set differential pressure, the valve port of the relief valve is automatically opened so as to directly discharge the petroleum gas in the liquid petroleum gas supply line into the intake manifold.

12. The improvement of claim 11, wherein a plurality of relief valves are provided in parallel between the liquid petroleum gas supply line and the intake manifold and the plurality of relief valves have respective set differential pressures which are different from each other, so that the plurality of relief valves sequentially operate based on the respective set differential pressures.

13. The improvement of claim 12, further comprising a pressure sensor provided in the petroleum gas supply line connecting the vaporizer to the fuel injection valve;
wherein when the pressure sensor detects the pressure of the liquid petroleum gas supply line is equal to or more than a predetermined pressure, the fuel shutoff valve is operated so as to shut off the liquefied petroleum gas fed to the vaporizer from the liquefied petroleum gas cylinder.

14. The improvement of claim 11, further comprising a pressure sensor provided in the liquid petroleum gas supply line connecting the vaporizer to the fuel injection valve;
wherein when the pressure sensor detects the pressure of the liquid petroleum gas supply line is equal to or more than a predetermined pressure, the fuel shutoff valve is operated so as to shut off the liquefied petroleum gas fed to the vaporizer from the liquefied petroleum gas cylinder.

* * * * *